| United States Patent [19] | [11] Patent Number: 4,744,993 |
| Bisson et al. | [45] Date of Patent: May 17, 1988 |

[54] PREPARATION OF A CASEIN-BASED PUFFED PRODUCT

[75] Inventors: Jean-Pierre Bisson, Saint Jean des Baisants; Michel Bussière, Beauvais; Gaston Fournet, Thonon-les-Bains; Pierre Jacquenod, Berneuil-en-Bray, all of France

[73] Assignee: Nestec S.A., Vevey, Switzerland

[21] Appl. No.: 862,134

[22] Filed: May 12, 1986

[30] Foreign Application Priority Data

May 21, 1985 [FR] France .................. 85 07605

[51] Int. Cl.$^4$ ................ A23C 9/13; A23J 1/20
[52] U.S. Cl. ...................... 426/38; 426/43; 426/61; 426/448; 426/516; 426/657
[58] Field of Search ............ 426/34, 38, 42, 43, 426/61, 580, 242, 445–448, 516, 657

[56] References Cited

U.S. PATENT DOCUMENTS 2,388,991 2/1942 Oatman .................. 426/42
3,036,918 5/1962 Wingerd et al. .......... 426/42
3,851,081 11/1974 Epstein ................. 426/448

FOREIGN PATENT DOCUMENTS 2004174 9/1977 United Kingdom .
2044774 10/1980 United Kingdom .

*Primary Examiner*—Raymond N. Jones
*Assistant Examiner*—Marianne M. Cintins
*Attorney, Agent, or Firm*—Vogt & O'Donnell

[57] ABSTRACT

A rennet casein-based puffed product is prepared by coagulating casein with rennet and adjusting the pH to from 5.1 to 5.7, drying it under controlled conditions, extruding it at a dry matter content of from 81% to 85% by weight and subjecting it to subatmospheric pressure. The product may be consumed as such, may be organoleptically modified, or may serve as a texturing, flavoring, or decorative agent in the preparation of culinary and confectionery-chocolate products.

12 Claims, No Drawings

PREPARATION OF A CASEIN-BASED PUFFED PRODUCT

BACKGROUND OF THE INVENTION

This invention relates to a process for the preparation of a casein-based dry puffed product and to its uses, particularly as a snack and as an ingredient in the preparation of culinary products and confectionery/chocolate products.

It is known that casein in the form of caseinate may be converted into dry puffed products of the snack type.

According to published British patent application No. 2,004,174, for example, a paste-like mass of acidic casein, an alkali carbonate and water is extruded under a pressure of from 30 to 50 bar and at a temperature of from 80° to 160° C. into an enclosure at atmospheric pressure and ambient temperature to prepare a caseinate. The elimination of water in the form of steam and carbon dioxide emanating from the reaction in the mass under the extrusion conditions causes the product to expand.

According to published British Pat. No. 2,044,774, the crispy character of the products obtained by the above method may be improved by addition of a modifying agent, such as an aldehyde, to the mass subjected to extrusion.

These methods use chemical agents of which the use is being increasingly restricted by food legislation and which affect the neutral taste of casein.

SUMMARY OF THE INVENTION

It has now been found that it is unexpectedly possible to structure casein without using chemical agents by extrusion-expansion and to prepare dry, puffed and crispy products of neutral taste which are suitable for use in various applications in the food industry.

The process according to the invention is characterized in that a rennet-type casein having a pH of from 5.1 to 5.7 is prepared and then dried at a temperature of the product not exceeding approximately 70° C. to a dry matter content of at least from 81 to 85% by weight, in that the product is extruded at a dry matter content of from 81 to 85% by weight and at a temperature of from 30° to 100° C. under a pressure sufficient to render it plastic, in that it is expanded by being subjected to a sub-atmospheric pressure and in that the strand obtained is size-reduced.

DESCRIPTION OF PREFERRED EMBODIMENTS

The starting casein is of the rennet type, i.e., it is mixed and predominantly rennet. It is prepared by coagulation of milk, preferably skimmed milk, with rennet and its pH is adjusted to 5.1-5.7 and advantageously to 5.2-5.4 before coagulation, preferably by biological acidification by means of ferments, for example, mesophilic ferments. It is different from the acidic caseins obtained by precipitation of milk with a strong acid at the isoelectric pH, i.e., pH 4.6. It is also different from caseinates emanating from the resolubilisation of acidic caseins with a strong base at a pH of 6.6-7. It differs from actual rennet caseins prepared by renneting of milk at a pH of 6.6-6.7. Finally, it has not been modified by chemical or enzymatic treatment.

The pH range selected is essential to the application of the process because, under these conditions, the casein has the necessary thermoplasticity to be extruded at temperatures below 100° C. without being denatured. It preferably contains as little lactose and residual fats as possible, for example, at most 1% by weight lactose and 1% by weight fats, so as to avoid browning by the Maillard reaction and the exudation of fats during subsequent drying.

The casein may be prepared by the usual cheese-making operations of renneting and inoculation of milk, cutting of the curd, drawing off of the whey, washing—optionally with stirring—and pressing of the curd grains, preferably to a dry matter content of from 44 to 48% by weight, in the form of blocks, for example, in moulds. The blocks may then be cut up into pieces and the pieces subsequently size-reduced, for example, in a crusher, cutter, or mill, preferably into grains 1 mm to 2 cm in size.

Alternatively, the blocks obtained after pressing of the curd may be salted, for example, in saturated brine, and then left drying before size-reduction into grains.

The following operation is the drying of the curd grains under controlled non-denaturing conditions, i.e. at a temperature of the product not exceeding approximately 70° C. They may be dried by various means, for example, in a vacuum oven, in a vacuum microwave furnace, in a hot air dryer or preferably, in a cylinder dryer, for example, comprising one or two cylinders. Where a cylinder dryer is used, the curd grains soften on contact with the heated walls of the cylinders and form a tacky mass of thermoplastic material which sticks to the cylinders, producing a dried film which may be removed from the cylinders, for example by means of scraper blades.

The film may then be broken up, for example, in a crusher, and converted into flakes, for example, by passage through the perforations of a drum. Since the contact time between the grains of casein and the heated cylinders is very short, it is occasionally difficult exactly to regulate the dry matter content of the product. Accordingly, it is preferred to dry the product to a dry matter content of from about 94 to 96% and then to adjust the dry matter content to the selected value by moistening the flakes, for example by spraying them with water.

The casein particles in the form of grains or flakes are then extruded as completely as possible in a temperature-controlled screw extruder. Temperature control may be effected, for example, by the circulation of water in the hollow core of the screw, in the double-skinned jacket surrounding the barrel and by contact with the nozzle-retaining collar. The dry matter content of the casein entering the extruder is critical. If it is less than 81% by weight, the paste-like material formed by fusion of the particles under the effect of heat and pressure during extrusion is too soft to be able to be suitably puffed. Beyond 85% by weight, the quantity of water present is too small for adequate expansion without mentioning the risk of browning by Maillard reaction despite the care taken to eliminate lactose during preparation of the casein. The dry matter content is preferably of the order of 83% by weight.

The temperature reached by the material in the extruder is also a critical factor in the process according to the invention. It should be high enough to impart to the material the plasticity required for passing smoothly through the bores in the nozzle, i.e., 30°-70° C. in the barrel and 40°-100° C. in the nozzle, the lower values of these ranges being preferred, although 100° C. is the upper limit beyond which the casein loses its functional and nutritional properties and the grains take on an unacceptable hardened appearance after their puffing. The residence time of the product in the extruder is of the order of 5 to 90 s. Naturally, the upper temperature values approaching 100° C. are only acceptable for a short residence time of the product towards the lower limit of the range.

The pressure prevailing in the barrel of the extruder will depend on the consistency of the paste and on its temperature, the rotational speed of the screw and the orifice diameters of the nozzle bores. The exit pressure at the nozzle may be from 9.8 to 15.7 MPa (100 to 160 kg/cm$^2$) and preferably from 14.7 to 15.7 MPa (150 to 160 kg/cm$^2$). The orifices of the bores are advantageously 5 to 15 mm and preferably around 6 mm in diameter. It is of course possible to use non-circular nozzle bores providing the product with a decorative form according to their profile.

For puffing, the paste-like material issuing from the nozzle bores is passed into an enclosure where a subatmospheric pressure prevails. Under the effect of the decompression, part of the water present in this material, i.e., around 40 to 50%, is evaporated while its temperature suddenly falls which causes its puffing and the rigidification of the cellular structure produced. The degree of puffing will depend on the dry matter content of the material entering the extruder and on the level of the vacuum prevailing in the puffing enclosure. Satisfactory results are obtained with a pressure in the enclosure of from 2 to 71 kPa (0.02 to 0.7 atms.) and preferably from 2.6 to 20 kPa (0.026 to 0.2 atms), giving products having an apparent density of from 100 to 130 g/l.

The strand issuing from the nozzle may be cut up, for example, by means of a rotary cutter. Particles resembling rodlets, pellets or chips may be obtained, depending on the rotational speed of the cutter and its proximity to the nozzles bores. The particles thus obtained drop to the bottom of the puffing enclosure, for example, onto a vibrating baseplate, and may be conveyed through an airlock. Alternatively, the extruded strand may be discharged into a space where atmospheric pressure prevails and may then be size-reduced to particles, for example, by crushing.

The product obtained is non-denatured, white in colour, slightly friable, crispy in texture and of neutral taste. Because it is extruded at low temperature and expanded in vacuo, it may be modified from the organoleptic viewpoint, for example, seasoned, sweetened, flavoured or coloured, for example, by mixing dried casein grains with flavouring, seasoning, sweetening, colouring starting materials before extrusion without any loss of taste or aroma.

Alternatively, the extruded and puffed particles may be impregnated with a liquid support, for example, a fat, a syrup, a liquor or an alcohol containing the starting materials in question.

The optionally modified product may be used as such as a crunchy snack.

It may constitute an ingredient in the preparation of various culinary products and confectionary/chocolate products. For example, when mixed in the mass or agglomerated, it may serve as a texturing or flavouring agent or even as the centre of a bar or a praline sweet or chocolate. When applied to the surface, it may serve as a coating or decorative agent.

The invention is illustrated by the following Examples in which the parts and percentages are by weight unless otherwise indicated.

EXAMPLES

The following equipment was used for the extrusion-puffing process, optionally with the modifications indicated in the Examples:

a feed hopper an extruder capable of an output of up to 20 kg/h of which the barrel is surrounded by a double jacket temperature-controllable to temperatures of from 12° to 150° C., which is equipped with a hollow-core screw 42 mm in diameter and 25 cm in length likewise temperature-controlled and capable of rotating at 9 to 66 r.p.m. and which has an extrusion nozzle with four bores 6 mm in diameter temperature-controlled by contact with the retaining collar, a twin-blade rotary cutter capable of rotating at 250 to 1265 r.p.m.

a puffing enclosure equipped with a liquid ring pump a vibrating baseplate an exit airlock.

EXAMPLE 1

Preparation of casein

Skimmed milk is pasteurized for 15 s at 72° C., cooled and then inoculated in a tank at 32° C. with mesophilic ferments (pH 5.3) and renneted with 30 ml of rennet (strength 1/10,000) to 100 ml milk. After coagulation, the coagulum is cut into approximately 5 mm grains, 60% of the whey is drawn off and the grains of casein are washed while stirring with water at 35° C. The liquid is drawn off, the casein is placed in moulds and then pressed in the moulds for 2 h under a mean pressure of 2 kPa (20 g/cm$^2$) at ambient temperature. After a residence time of 24 h in the moulds, the blocks are removed and stored at 4° C. The product obtained has the following characteristics and composition:

|  | % |
| --- | --- |
| Dry matter | 44–48 |
| including fats | <1 |
| lactose | <1 |
| casein | 40–43 |
| ash | 3–4 |
| Water | balance to 100% |
| pH | 5.2–5.4 |

The blocks are cut up into pieces and then crushed to form 1–5 mm grains.

Drying of the casein

The grains are delivered through a hopper onto a chromium-plated single-cylinder dryer heated with steam under a pressure of 500 kPa (5 bar). The dryer has a surface area of 1 m$^2$ and rotates at 9 r.p.m. Its output is 11–13 kg/h/m$^2$. A film of dry product is removed from the cylinder by means of a scraper blade, broken up in a crusher and then converted into 2 mm flakes by forcing it through the holes of a perforated drum.

The flakes obtained have the following composition:

|  | % |
|---|---|
| Dry matter | 96 |
| including lactose | 1-2 |
| fats | 1 |
| ash | 8-9 |
| including calcium | 2-2.5 |
| casein | 81.5-84 |
| Water | 4 |

The flakes are then moistened by spraying with water in a mixer to a dry matter content of 83%.

Extrusion-puffing of the casein

The moistened flakes are treated in the equipment specified above and with the following operating parameters:
screw speed: 32 r.p.m.
cutter speed: 1070 r.p.m.
barrel temperature: 30° C.
head temperature: 40° C.
pressure at nozzle: 15.7 MPa (160 kg/cm²)
pressure in puffing enclosure: 4 kPa (0.04 atm).

The puffed grains obtained are slightly friable, from 6 to 10 mm in diameter, have an apparent density of approximately 102 g/l and a dry matter content of 91%, are white in colour and of entirely neutral taste and have an agreeable crispness.

By comparison, it is possible to extrude acidic casein and sodium caseinate having a dry matter content of 83% under the same working conditions. However, the acidic casein on tasting has the drawback of a highly acidulated product while the sodium casein has a strong and extremely unpleasant caseinate taste.

EXAMPLE 2

The procedure is as in Example 1, except that:
during preparation of the casein, the casein is pressed in moulds for 4 h under a mean pressure of 4 kPa (40 g/cm²), the blocks are removed from the moulds and pickled in saturated brine at 14° C. for 72 h and the pickled blocks are dried for 24 h at 14° C., the blocks are cut up and then crushed into 5 mm grains
the grains of casein are dried in a microwave oven consisting of an evacuable enclosure provided with an entrance and an exit through an airlock and with a conveyor belt under the following conditions:
power of the magnetron: 6.8 kW
entry rate: 18 kg/h
pressure in enclosure: 2 kPa (0.02 atms.)
temperature in vicinity of the product: 68° C.
residence time: 55 mins.
and the grains are size-reduced by forcing them through a perforated drum of which the perforations are 3 mm in diameter.

The grains obtained have a dry matter content of 83% so that it is not necessary to moisten them before extrusion-expansion.

The puffed grains obtained are similar in every respect to those of Example 1.

EXAMPLES 3-6

Preparation of seasoned flavoured ingredients

The extrusion-puffing of a mixture of the casein grains dried in a microwave oven as in Example 2 and flavouring powders under the conditions shown in Table 1 below gives flavoured casein grains of acceptable colour and taste which constitute excellent ingredients providing both flavour and texture.

TABLE 1

| Example No. | Casein % | Flavouring % | Extrusion conditions | | | |
|---|---|---|---|---|---|---|
| | | | Barrel temperature °C. | Head temperature °C. | Screw speed r.p.m. | Cutter speed r.p.m. |
| 3 | 95.2 | boletus powder *Boletus edulis*: 4.8 | 50 | 70 | 9 | 1000 |
| 4 | 91.3 | fish and tuna flavouring: 8.7 | 30 | 40 | 32 | 1000 |
| 5 | 90.8 | chicken flavouring: 5.5 vegetable protein hydrolysate: 3.7 | 30 | 40 | 32 | 1000 |
| 6 | 92.6 | shrimp flavouring: 3.7 shrimp meal: 3.7 | 30 | 40 | 32 | 1000 |

EXAMPLES 7-9

Preparation of flavoured and coloured snacks

In these Examples, the extruded-puffed casein grains prepared as in Example 1 are flavoured and/or coloured by spraying with flavouring and/or colouring in solution in a liquid fat (heated if necessary). Table 2 below shows the composition of the products obtained:

TABLE 2

| Example No. | Casein | Colouring/flavouring | Fat |
|---|---|---|---|
| 7 | 49.95 | annatto colouring (yellow) fat-soluble: 0.1 | hydrogenated coconut oil 49.95 |
| 8 | 49.75 | chlorophyllin (green) fat-soluble: 0.5 | 49.75 |
| 9 | 80 | menthol in grapeseed oil: 20 | |

EXAMPLES 10-11

Preparation of batter-coated products

Example 10: The extruded-puffed casein grains prepared as in Example 2 are ground to give particles 3.2 mm long and 0.8 mm in diameter. These particles are incorporated in a frying batter which is then used to coat deep-frozen mackerel fillets in the following proportions:

|  | % |
|---|---|
| Mackerel fillet | 89 |
| Casein | 8 |
| Frying batter | 3 |

The coated fillets are pan-fried. On tasting, they show remarkable crispness; the batter coating is judged to be light.

Example 11: Deep-frozen shrimps are coated using the flavoured grains prepared as in Example 6 ground into particles 2.5 mm in diameter with and without frying batter. They are prefried by deep frying and then frozen. Reheated in an oven, the shrimps show remarkable crispness, the tasters having a preference for the batter coating (batter) which is judged to be lighter than that without batter (breadcrumbs).

EXAMPLES 12-13

Preparation of coated products

The extruded-puffed grains prepared as in Example 1 are used for decoration:

Example 12: After prefrying, balls of a potato puree are coated with 5% (based on the total weight) of casein grains and then frozen. The white grains provide a pleasant contrast to the golden potato balls.

Example 13: The grains are placed on the surface of a pale yellow fatty composition based on white vanilla-flavoured chocolate in liquid form intended to serve as a coating for ice lollies. By virtue of their low density, the grains remain on the surface. When the ice lollies are immersed in the coating composition thus prepared, the white grains are uniformly distributed over the surface of the lolly and provide it with a pleasant appearance.

EXAMPLES 14-15

Use as a texturing agent

In this application, the grains prepared as in Example 1 are ground. The particles obtained are intended to be incorporated in the body of culinary preparations to provide them with a pulled curd texture in place of cheese. They have the advantage over cheese of a neutral taste.

Example 14: An asparagus souffle is prepared with the following ingredients in the proportions indicated:

|  | % |
| --- | --- |
| Casein | 16.1 |
| Dehydrated asparagus | 20 |
| Skimmed milk | 19.3 |
| Potato flakes | 16.1 |
| Chemical yeast | 9 |
| Dehydrated whole egg | 9.7 |
| Modified starch | 6.4 |
| Salt | 1.6 |
| Spices on a salt support | 0.5 |
| Vegetable fats | 1.3 |

After cooking, the souffle is firm with a cellular texture and a clear taste of asparagus.

Example 15: The casein particles and a cheese flavouring are incorporated in a potato puree for forming into balls in the following proportions:

|  | % |
| --- | --- |
| Potato puree | 90.6 |
| Casein | 9.1 |
| Natural cheese flavouring | 0.3 |

After freezing and frying, the balls show a pulled curd texture when opened hot.

EXAMPLES 16-18

Preparation of bars

The extruded-puffed casein grains prepared as in Example 1 are used as internal base for preparing sweetened chocolate bars by agglomeration.

Example 16: Hot chocolate is poured onto the grains, the chocolate-coated grains are placed in parallelepipedic moulds, the molds are cooled and the articles subsequently removed therefrom. They are then given a chocolate coating.

Example 17: The following ingredients are mixed in the proportions indicated:

|  | % |
| --- | --- |
| Honey-coated puffed wheat | 46 |
| Casein | 36 |
| Hydrogenated coconut oil | 18 |

Parallelepipedic molds are filled with the mixture which is then compressed in the molds under a pressure of 98 kPa (11 kg/cm$^2$) to form tablets measuring 8 cm×4 cm×1 cm.

Example 18: The procedure is as in Example 17 using a mixture of the following ingredients in the proportions indicated:

|  | % |
| --- | --- |
| Birchermuesli (mixture of cereal flakes and pieces of dried fruits) | 70.8 |
| Casein | 15.1 |
| Hydrogenated coconut oil | 9.1 |
| Icing sugar | 5 |

The tablets obtained are balanced in their proportions of proteins, lipids and carbohydrates.

EXAMPLE 19

Preparation of a product of the crisp type

A highly puffed and extremely crispy product is prepared from casein flakes dried and then moistened to a dry matter content of 83% as in Example 1 which are extruded-puffed under the same conditions as in Example 1 apart from the following differences:

a nozzle with a single bore 15 mm in diameter a cutter with a single blade rotating at 1000 r.p.m.

pressure in the puffing enclosure: 2.6 kPa (0.026 atm).

Translucent, slightly puffed slices having a dry matter content of from 88.5 to 89% are obtained.

The slices are then thrown into frying oil at 190° C. where they puff instantaneously. The crisps obtained are highly puffed and crispy and have the following composition:

|  | % |
| --- | --- |
| Fats | 55 |
| Casein | 39.1 |
| Ash | 3.4 |
| Water | 2.5 |

These crisps may of course be flavoured, spiced, salted or coloured.

We claim:

1. A process for the preparation of a casein-based puffed product comprising drying a rennet casein curd having a pH of from 5.1 to 5.7 at a product temperature not exceeding approximately 70° C. to a dry matter content of at least from 81% to 85% by weight, extruding the dried curd at a dry matter content of from 81% to 85% by weight at a product temperature of from 30° C. to 100° C. under a pressure sufficient to render it plastic, puffing the extruded curd by subjecting it to sub-atmospheric pressure and then discharging the puffed curd product from the sub-atmospheric pressure to atmospheric pressure.

2. A process as claimed in claim 1 wherein the rennet casein has a pH of from 5.2 to 5.4.

3. A process as claimed in claim 1 wherein the curd has a maximum lactose content of 1% and a maximum fats content of 1%.

4. A process as claimed in claim 1 wherein the curd is dried to a dry matter content of approximately 94% to 96% by weight and further comprising moistening the dried curd to a dry matter content of from 81% to 85% by weight prior to extruding the curd.

5. A process as claimed in claim 1 wherein the dried curd is extruded in an extruder comprising a barrel and a multiple-bore nozzle at a product temperature of from 30° C. to 70° C. in the extruder barrel and from 40° C. to 100° C. in the nozzle under a pressure in the nozzle of from 14.7 MPa to 15.7 MPa.

6. A process as claimed in claim 1 further comprising organoleptically modifying the puffed product by impregnating it with material selected from the group consisting of flavorings, seasonings, sweeteners, fats, syrups, liquors and alcohols, colorings and combinations thereof.

7. A process as claimed in claim 1 or 3 further comprising preparing the rennet casein curd from rennet and a material selected from the group consisting of milk and skimmed milk and adjusting the pH of the rennet casein of from 5.1 to 5.7.

8. A process as claimed in claim 7 wherein the pH is adjusted by biologically acidifying with ferments.

9. A process as claimed in claim 7 wherein the pH is adjusted by acidifying with mesophilic ferments.

10. A process as claimed in claim 1 or 3 further comprising pressing the curd to obtain a dry matter content of 44% to 48% by weight prior to drying.

11. A process as claimed in claim 1 or 3 or 5 wherein the sub-atmospheric pressure is from 2 kPa to 71 kPa.

12. A process according to claim 11 wherein the sub-atmospheric pressure is from 2.6 kPa to 20 kPa.

* * * * *

UNITED STATES PATENT AND TRADEMARK OFFICE
CERTIFICATE OF CORRECTION

PATENT NO. : 4,744,993

DATED : May 17, 1988

INVENTOR(S) : Jean-Pierre Bisson, et al.

It is certified that error appears in the above-identified patent and that said Letters Patent is hereby corrected as shown below:

Column 1, line 61, before "caseinates" insert the word --the--.

Signed and Sealed this

Eighteenth Day of October, 1988

Attest:

DONALD J. QUIGG

*Attesting Officer*   *Commissioner of Patents and Trademarks*